(12) United States Patent
Takami et al.

(10) Patent No.: US 10,483,526 B2
(45) Date of Patent: Nov. 19, 2019

(54) POSITIVE ELECTRODE ACTIVE MATERIAL, NONAQUEOUS ELECTROLYTE BATTERY, AND BATTERY PACK

(71) Applicant: KABUSHIKI KAISHA TOSHIBA, Minato-ku (JP)

(72) Inventors: Norio Takami, Yokohama (JP); Keigo Hoshina, Yokohama (JP); Hiroki Inagaki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/200,414

(22) Filed: Mar. 7, 2014

(65) Prior Publication Data

US 2014/0295276 A1 Oct. 2, 2014

(30) Foreign Application Priority Data

Mar. 26, 2013 (JP) ................................. 2013-064578

(51) Int. Cl.
*H01M 4/58* (2010.01)
*H01M 4/136* (2010.01)
(Continued)

(52) U.S. Cl.
CPC .......... *H01M 4/136* (2013.01); *H01M 4/366* (2013.01); *H01M 4/485* (2013.01);
(Continued)

(58) Field of Classification Search
CPC .................................................. H01M 4/5825
See application file for complete search history.

(56) References Cited

U.S. PATENT DOCUMENTS

2010/0248038 A1* 9/2010 Takami ................. H01M 4/364
429/332
2010/0297490 A1* 11/2010 Takami ............... H01M 2/1633
429/131
(Continued)

FOREIGN PATENT DOCUMENTS

CN 101232094 A 7/2008
CN 102694168 A 9/2012
(Continued)

OTHER PUBLICATIONS

Extended Search Report dated Jun. 6, 2014 in European Patent Application No. 14158372.4.
(Continued)

*Primary Examiner* — Stewart A Fraser
*Assistant Examiner* — Victoria H Lynch
(74) *Attorney, Agent, or Firm* — Oblon, McClelland, Maier & Neustadt, L.L.P.

(57) ABSTRACT

According to one embodiment, there is provided a positive electrode active material containing positive electrode active material particles. The positive electrode active material particles have an olivine structure. The positive electrode active material particles are represented by $LiMn_{1-x-y}Fe_xM_yPO_4$ ($0<x\leq0.5$, $0\leq y\leq0.2$, and M is at least one element selected from the group consisting of Mg, Ni, Co, Sn, and Nb) and satisfy, Formula (1) below.

$$\beta < \alpha \quad (1),$$

wherein $\alpha$ is a ratio of Fe in $LiMn_{1-\alpha-y}Fe_\alpha M_yPO_4$, and $\beta$ is a ratio of Fe in $LiMn_{1-\beta-y}Fe_\beta M_yPO_4$.

13 Claims, 4 Drawing Sheets

(51) Int. Cl.
  *H01M 4/36* (2006.01)
  *H01M 4/485* (2010.01)
  *H01M 4/62* (2006.01)
  *H01M 10/0525* (2010.01)

(52) U.S. Cl.
  CPC ......... *H01M 4/5825* (2013.01); *H01M 4/625* (2013.01); *H01M 10/0525* (2013.01)

(56) References Cited

U.S. PATENT DOCUMENTS

| | | |
|---|---|---|
| 2011/0236752 A1 | 9/2011 | Kawakami et al. |
| 2012/0129015 A1* | 5/2012 | Inagaki ............... H01M 2/1061 429/7 |
| 2012/0237833 A1 | 9/2012 | Guerfi et al. |
| 2013/0337327 A1* | 12/2013 | Sun .................... H01M 4/0471 429/219 |

FOREIGN PATENT DOCUMENTS

| | | | |
|---|---|---|---|
| JP | 2001-243948 | 9/2001 | |
| JP | 2010-225486 | 10/2010 | |
| JP | 2013-504858 | 2/2013 | |
| JP | 2011-181375 | 9/2015 | |
| WO | WO-2010137156 A1 * | 12/2010 | .......... H01M 2/1061 |
| WO | WO 2012067449 * | 5/2012 | .......... H01M 10/052 |

OTHER PUBLICATIONS

Office Action dated Sep. 2, 2015 in European Patent Application No. 14 158 372.4.
Combined Office Action and Search Report dated Oct. 30, 2015 in Chinese Patent Application No. 201410092161.8 with English translation.
Chinese Office Action dated May 27, 2016, in corresponding Chinese Patent Application No. 20140092161.8 (with English-language Translation).
Office Action dated Jul. 25, 2017, in corresponding Japanese Patent Application No. 2014-056402.

* cited by examiner

POSITIVE ELECTRODE ACTIVE MATERIAL, NONAQUEOUS ELECTROLYTE BATTERY, AND BATTERY PACK

CROSS-REFERENCE TO RELATED APPLICATIONS

This application is based upon and claims the benefit of priority from Japanese Patent Application No. 2013-064578, filed Mar. 26, 2013, the entire contents of which are incorporated herein by reference.

FIELD

Embodiments described herein relate generally to a positive electrode active material, nonaqueous electrolyte battery, and battery pack.

BACKGROUND

As a secondary battery for portable devices, a lithium ion secondary battery is widely used. For example, a lithium metal oxide such as $LiCoO_2$ or $LiMn_2O_4$ is used for a positive electrode of the lithium ion secondary battery, while a carbonaceous material absorbing and releasing lithium ions is used for a negative electrode.

On the other hand, there are demands for the secondary battery used for vehicles or electricity storage systems, such as storage performance, float charge resistance, cycle life performance, high output, safety, and long-term reliability in high temperature environments. Accordingly, a material excellent in chemical and electrochemical stability is required as a material of the positive and negative electrodes of the secondary battery. Study of $LiFePO_4$ as a positive-electrode material is proceeded; however, there are problems such as a decrease in energy density due to a decrease in electromotive force and a decrease in high-temperature endurance. Therefore, in order to use the secondary battery (which is mounted on an electricity storage system to be fixed) as a power source in place of a lead storage battery, there is a need for a secondary battery excellent in energy density, cycle life, and float charge resistance.

DETAILED DESCRIPTION

Figure 1:
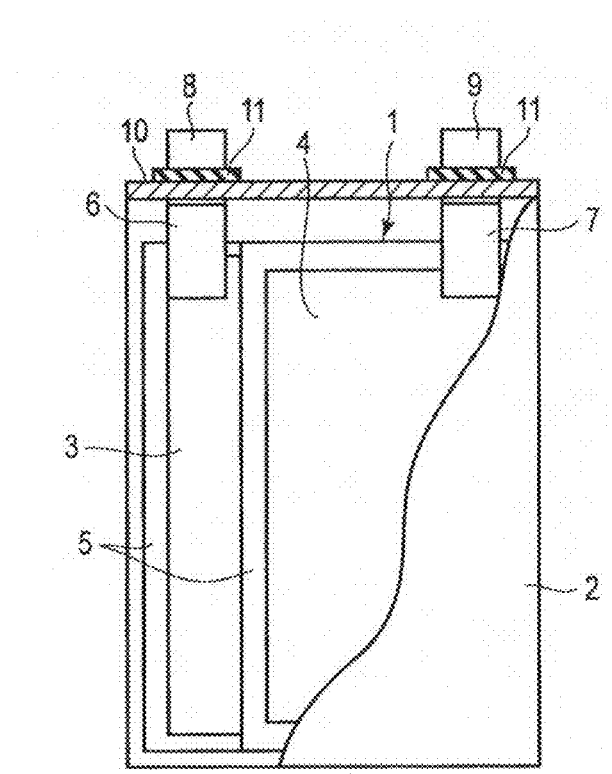
FIG. 1 is a partially cutaway cross-sectional view of a nonaqueous electrolyte battery of an embodiment.

According to the embodiments, there is provided a positive electrode active material containing positive electrode active material particles. The positive electrode active material particles have an olivine structure. The positive electrode active material particles are represented by $LiMn_{1-x-y}Fe_xM_yPO_4$ ($0<x\leq0.5$, $0\leq y\leq0.2$, and M is at least one element selected from the group consisting of Mg, Ni, Co, Sn, and Nb). The positive electrode active material particles satisfy Formula (1) below.

$$\beta < \alpha \qquad (1),$$

wherein $\alpha$ is a ratio of Fe in $LiMn_{1-\alpha-y}Fe_\alpha M_yPO_4$ which is a composition of a surface of the positive electrode active material particles, and $\beta$ is a ratio of Fe in $LiMn_{1-\beta-y}Fe_\beta M_yPO_4$ which is a composition of a central portion of the positive electrode active material particles.

According to the embodiments, there is provided a nonaqueous electrolyte battery which includes a positive electrode containing the positive electrode active material of the embodiments, a negative electrode, and a nonaqueous electrolyte.

According to the embodiments, there is provided a battery pack including a nonaqueous electrolyte battery according to the embodiments.

First Embodiment

According to the first embodiment, there is provided a positive electrode active material including positive electrode active material particles. The positive electrode active material particles have an olivine structure and are represented by $LiMn_{1-x-y}Fe_xM_yPO_4$ ($0<x\leq0.5$, $0\leq y\leq0.2$, and M is at least one element selected from the group consisting of Mg, Ni, Co, Sn, and Nb.). The positive electrode active material particles satisfy Formula (1) below.

$$\beta < \alpha \qquad (1)$$

wherein $\alpha$ is a ratio of Fe when the composition of the surface of the positive electrode active material particles is represented by $LiMn_{1-\alpha-y}Fe_\alpha M_yPO_4$ (M is at least one element selected from the group consisting of Mg, Ni, Co, Sn, and Nb.), and $\beta$ is a ratio of Fe when the composition of the central portion of the positive electrode active material particles is represented by $LiMn_{1-\beta-y}Fe_\beta M_yPO_4$ (M is at least one element selected from the group consisting of Mg, Ni, Co, Sn, and Nb).

In the positive electrode active material particles, the composition of the surface differs from the composition of the central portion. $LiMn_{1-x-y}Fe_xM_yPO_4$ is an average composition of the positive electrode active material particles. When the ratio x of Fe in the average composition exceeds 0.5, the average voltage is decreased and the energy density is decreased. When the ratio y of the element M in the average composition exceeds 0.2, the capacity is suddenly decreased. More preferably, the ratio is 0.1 or less. When the ratio is within this range, an influence due to a decrease in the capacity is small.

Positive electrode active material particles which have an olivine structure and are represented by $LiMn_{1-x-y}Fe_xM_yPO_4$ satisfy Formula (1) so that the lithium absorbing-releasing performance of the surfaces of positive electrode active material particles can be improved. Accordingly, the electron conductivity of the positive electrode active material particles can be improved. As a result, even in the case where a charging state (SOC) is high (e.g., 100%), like the charge/discharge cycle and the float charge, the reaction of the positive electrode and the nonaqueous electrolyte in both the processes can be suppressed. Thus, an increase in interface resistance of the positive electrode and capacity degradation can be reduced. This is because the growth of a film on the surface of the positive electrode during charge/discharge cycle and storage is suppressed, an increase in resistance of the positive electrode during storage is reduced, and the storage performance is improved. Therefore, a nonaqueous electrolyte battery comprising a positive electrode which contains the positive electrode active material allows the cycle life, float charge resistance, and discharge rate performance to be improved.

When a carbon-containing material is adhered to at least a part of the surfaces of the positive electrode active material particles, the electron conductivity of the positive electrode active material particles wherein the $\alpha$ is $0.1 \leq \alpha < 1$ can be made excellent. Thus, the energy density and discharge rate performance of the nonaqueous electrolyte battery can be further improved.

In the positive electrode active material particles, when the $\beta$ is $0 \leq \beta \leq 0.5$, the $\alpha$ becomes larger than the $\beta$. Thus, positive electrode active material particles having excellent electron conductivity can be obtained so that a nonaqueous electrolyte battery excellent in energy density and discharge rate performance can be attained.

In the positive electrode active material particles, when the $\alpha$ is $0.3 \leq \alpha \leq 0.5$, the $\beta$ is $0 \leq \beta \leq 0.3$, and the carbon-containing material is adhered to at least a part of the surfaces of the positive electrode active material particles, the electron conductivity of the positive electrode active material particles can be further improved. Thus, the cycle life, float charge resistance, and discharge rate performance of the nonaqueous electrolyte battery can be further improved.

The positive electrode active material particles may be primary or secondary particles. In each case, when the ratio of Fe of the surface of the particles is larger than the ratio of Fe of the inside of the particles, the effect of the positive electrode active material of the embodiment can be obtained. In either the primary particles or the secondary particles of the positive electrode active material particles, the ratio of Fe can be measured by the following method. Transmission electron microscope (TEM) images of the cross section of the particles are subjected to electron probe microanalysis (EPMA). The composition of the surface as well as the composition of the central portion as to the particles are measured. Then, a ratio $\alpha$ of Fe of the composition of the surface ($LiMn_{1-\alpha-y}Fe_\alpha M_y PO_4$) is compared with a ratio $\beta$ of Fe of the composition of the central portion ($LiMn_{1-\beta-y}Fe_\beta M_y PO_4$). At least one of the positive electrode active material primary particles and the positive electrode active material secondary particles preferably satisfy the Formula (1).

As the average composition, an average of the composition of the surface ($LiMn_{1-\alpha-y}Fe_\alpha M_y PO_4$) and the composition of the central portion ($LiMn_{1-\beta-y}Fe_\beta M_y PO_4$) is used. In any one of particles which form primary particles or secondary particles, one or more portions (for example, 10 portions) are selected from each of the surface portion and the central portion.

In the case of the surface portion, one or more portions are selected from either a range of several nanometers (for example, a range of 1 to 10 nm) in thickness from the surface of the cross section of the particle or a range of several nanometers (for example, a range of 1 to 10 nm) in depth from the surface of the particle. The composition of each portion is measured.

As the central portion of the primary particle and the central portion of the secondary particle, the center of gravity of a cross section of any one of the particles can be used. The center of gravity of the cross section of the particle is obtained by the following method: the area of the cross section is measured; the shape of the cross section is approximated to a model shape (for example, a square or a circle) similar to the actual particle shape without changing the area value; and the center of the obtained shape is determined as the center of gravity.

The composition of the central portion is obtained by the following method: the composition of the center of gravity is measured; and one or more portions are selected from a peripheral portion several nanometers (for example, a range of 1 to 10 nm) apart from the center of gravity, and the compositions of the selected portions are measured.

An average composition is obtained from the compositions of the portions thus obtained. The average composition of at least one of the primary particle and the secondary particle preferably satisfies the Formula (1).

The average diameter of the primary particles of the positive electrode active material particles is preferably from 0.01 to 1 µm. More preferably, it is from 0.01 to 0.5 µm. An influence in diffusion resistance of lithium ions in the active material can be reduced when the average diameter is set to within a range of 0.01 to 1 µm. Thus, the output performance can be improved. The primary particles may aggregate to form secondary particles having a size of 10 µm or less.

The average particle size of the positive electrode active material particles is measured by the following method. A laser diffraction particle size analyzer (SALD-300, Shimadzu Corporation) was used. First, about 0.1 g of a sample, a surfactant, and 1 to 2 mL of distilled water were added to a beaker and sufficiently stirred. The mixture was placed in an agitation bath and the luminous intensity distribution was measured at intervals of 2 seconds 64 times. The particle size was measured by a method of analyzing particle size distribution data. The D50 value is defined as the average particle size.

The carbon-containing material can be adhered to at least a part of the surfaces of the positive electrode active material particles. Thus, the electron conductivity of the positive electrode active material particles can be improved. The carbon-containing material preferably contains a carbonaceous material having an interplanar spacing $d_{002}$ of 0.344 nm or more derived from (002) reflection according to the powder X-ray diffraction. Such a carbonaceous material can be formed at a low heating temperature of about 700° C. Thus, the crystallinity of the positive electrode active material particles does not become excessively high, which allows the lithium absorbing-releasing performance of the positive electrode active material particles to be excellent.

The positive electrode active material particles according to the first embodiment can be synthesized by, for example, the following method. Hydrothermal synthesis is performed using a solution containing manganese sulfate ($MnSO_4 \cdot 5H_2O$), iron sulfate ($FeSO_4 \cdot 7H_2O$), lithium sulfate ($Li_2SO_4$), and ammonium hydrogen phosphate to obtain a precursor. Thereafter, the precursor is pulverized with a ball mill, and subjected to heat treatment in an argon atmosphere to synthesize first positive electrode active material particles for the central portion. Subsequently, the concentration of Fe in the solution is increased, and the first positive electrode active material particles are mixed with the solution with a high concentration of Fe and stirred. Thereafter, the mixture is subjected to a hydrothermal synthesis to obtain a precursor. Then, the precursor is pulverized with a ball mill, and subjected to heat treatment in an argon atmosphere to obtain positive electrode active material particles according to the first embodiment. Thus, the first positive electrode active material particles forming the central portion are synthesized and then the positive electrode active material with a high concentration of Fe is synthesized on the surfaces of the first positive electrode active material particles so that the positive electrode active material particles according to the first embodiment can be obtained. The ratio of Fe can be adjusted by changing the concentration of Fe in the solution. Further, the ratio of Fe can be changed by changing the pressure, temperature, and treatment time during the hydrothermal synthesis.

According to the positive electrode active material of the first embodiment described above, the electron conductivity of the positive electrode active material particles can be improved, because the particles have an olivine structure, are represented by $LiMn_{1-x-y}Fe_xM_yPO_4$, and satisfy Formula (1) ($\beta<\alpha$). As a result, even in the case where a charging state (SOC) is high (e.g., 100%), the reaction of the positive electrode and the nonaqueous electrolyte can be suppressed. Thus, an increase in interface resistance of the positive electrode and capacity degradation can be reduced. Accordingly, it is possible to realize a nonaqueous electrolyte battery excellent in cycle life, float charge resistance, and discharge rate performance.

Second Embodiment

According to the second embodiment, there is provided a nonaqueous electrolyte battery including a positive electrode, a negative electrode, and a nonaqueous electrolyte. The positive electrode contains the positive electrode active material of the first embodiment. In the battery of the second embodiment, a separator can be arranged between the positive electrode and the negative electrode. Further, a case for housing these items and the nonaqueous electrolyte can be included.

Hereinafter, the positive electrode, the negative electrode, the nonaqueous electrolyte, the separator, and the case will be described in detail.

(1) Positive Electrode

The positive electrode includes a positive electrode current collector and a positive electrode material layer (positive electrode active material containing layer) including the positive electrode active material of the first embodiment, a conductive agent, and a binder, which is supported on one surface or both sides of the positive electrode current collector.

Examples of the conductive agent can include acetylene black, carbon black, graphite, and carbon fiber.

Examples of the binder include polytetrafluoroethylene (PTFE), polyvinylidene fluoride (PVdF), and fluorine-based rubber.

As for the compounding ratio of the positive electrode active material, the conductive agent, and the binder, it is preferable that the content of the positive electrode active material is from 80 to 95% by weight, the content of the conductive agent is from 3 to 19% by weight, and the content of the binder is from 1 to 7% by weight.

The specific surface area of the positive electrode material layer measured by the BET adsorption method is preferably from 0.1 to 2 $m^2/g$.

The positive electrode current collector is preferably aluminum foil or aluminum alloy foil. The thickness of the positive electrode current collector is preferably 20 μm or less, more preferably 15 μm or less.

The positive electrode is produced, for example, by suspending the positive electrode active material, conductive agent, and binder in an appropriate solvent, applying the slurry to the positive electrode current collector, drying it, and pressing it.

(2) Negative Electrode

The negative electrode includes a negative electrode current collector and a negative electrode material layer (negative electrode active material containing layer) including an active material, a conductive agent, and a binder, which is supported on one surface or both sides of the current collector.

The negative electrode active material is not particularly limited as long as it can absorb and release lithium ions. Examples of the negative electrode active material include lithium alloys (e.g., an alloy of lithium and the metal to be alloyed with lithium such as at least one selected from the group consisting of Si, Al, Sn, and Zn), carbon-containing materials, graphite materials, metal oxides, and metal sulfides. A titanium-containing metal oxide is preferred.

Examples of the titanium-containing metal oxide include a lithium titanium oxide, a titanium oxide, and a niobium titanium oxide.

Examples of the lithium titanium oxide include $Li_{4/3+x}Ti_{5/3}O_4$ having a spinel structure ($0\leq x\leq 1$), $Li_{2+x}Ti_3O_7$ having a ramsdellite structure (x is $-1\leq x\leq 3$), $Li_{1+x}Ti_2O_4$ ($0\leq x\leq 1$), $Li_{1.1+x}Ti_{1.8}O_4$ ($0\leq x\leq 1$), $Li_{1.07+x}Ti_{1.86}O_4$ ($0\leq x\leq 1$) and $Li_xTiO_2$ ($0\leq x\leq 1$). Examples thereof include one in which a part of Ti of the lithium titanium oxide is substituted by at least one element selected from the group consisting of Nb, Mo, W, P, V, Sn, Cu, Ni, and Fe. The lithium titanium oxide having a spinel structure is preferred.

Examples of the titanium oxide include $TiO_2$ having an anatase structure and monoclinic system $TiO_2$ (B) ($TiO_2$ (B) having a bronze structure)). As the titanium oxide, one having a low crystallinity obtained by heat-treating at 300 to 600° C. can be used. Irreversible lithium may remain in the titanium oxide after charge/discharge of the battery. Thus, the titanium oxide after charge/discharge of the battery can be represented by $Li_xTiO_2$ ($0\leq x$, more preferably $0<x\leq 1$). Further, examples thereof include one in which a part of Ti of the titanium oxide is substituted by at least one element selected from the group consisting of Nb, Mo, W, P, V, Sn, Cu, Ni, and Fe. Titanium dioxide having a monoclinic system structure is preferred.

Examples of the niobium titanium oxide include $Li_xNb_aTiO_7$ ($0\leq x$ (preferably, $0\leq x\leq 1$, $1\leq a\leq 4$) and $Li_xNb_aTi_bO_c$ ($0\leq x\leq 3$, $0<a\leq 3$, $0<b\leq 3$, $5\leq c\leq 10$). Examples of $Li_xNb_aTi_bO_c$ include $Li_xNb_2TiO_7$, $Li_xNb_2Ti_2O_9$, and $Li_xNbTiO_5$. $Li_xTi_{1-y}Nb_yNb_2O_{7+\sigma}$ ($0\leq x\leq 3$, $0\leq y\leq 1$, $0\leq \sigma\leq 0.3$) heat-treated at 800° C. to 1200° C. has a high true density so that the specific volume capacity can be increased. Since $Li_xNb_2TiO_7$ has a high density and a high capacity, it is preferred. Thus, the capacity of the negative electrode can be increased. Further, a part of Nb or Ti in the niobium titanium oxide may be substituted by at least one element selected from the group consisting of V, Zr, Ta, Cr, Mo, W, Ca, Mg, Al, Fe, Si, B, P, K, and Na.

Figure 6:
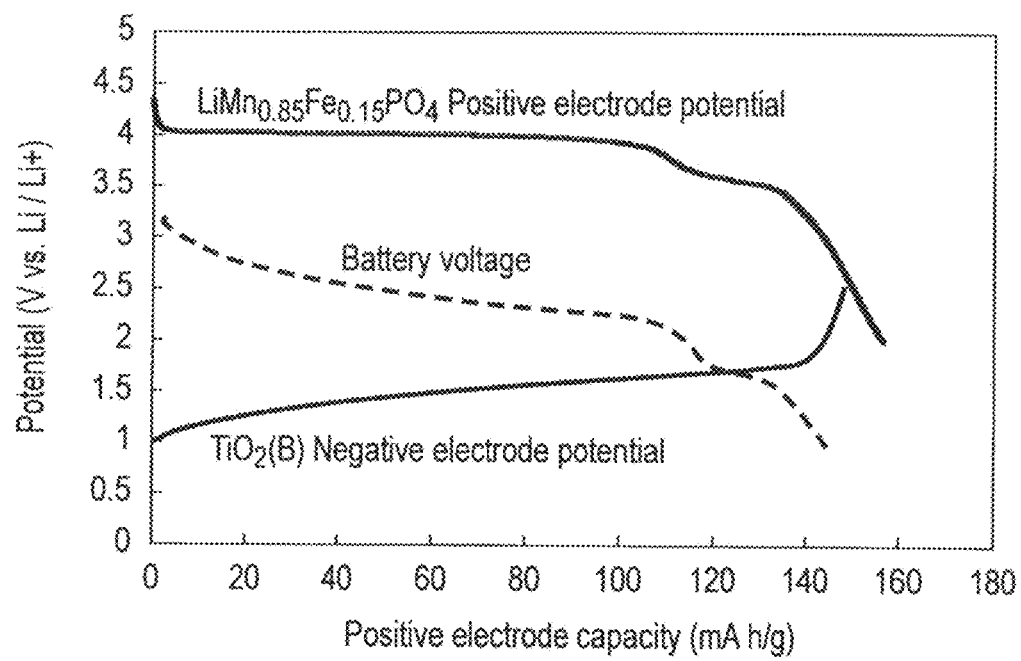
FIG. 6 is a view showing discharge curves of a positive electrode potential, a negative electrode potential, and a battery voltage as for an example of the nonaqueous electrolyte battery of the embodiment.
Figure 7:
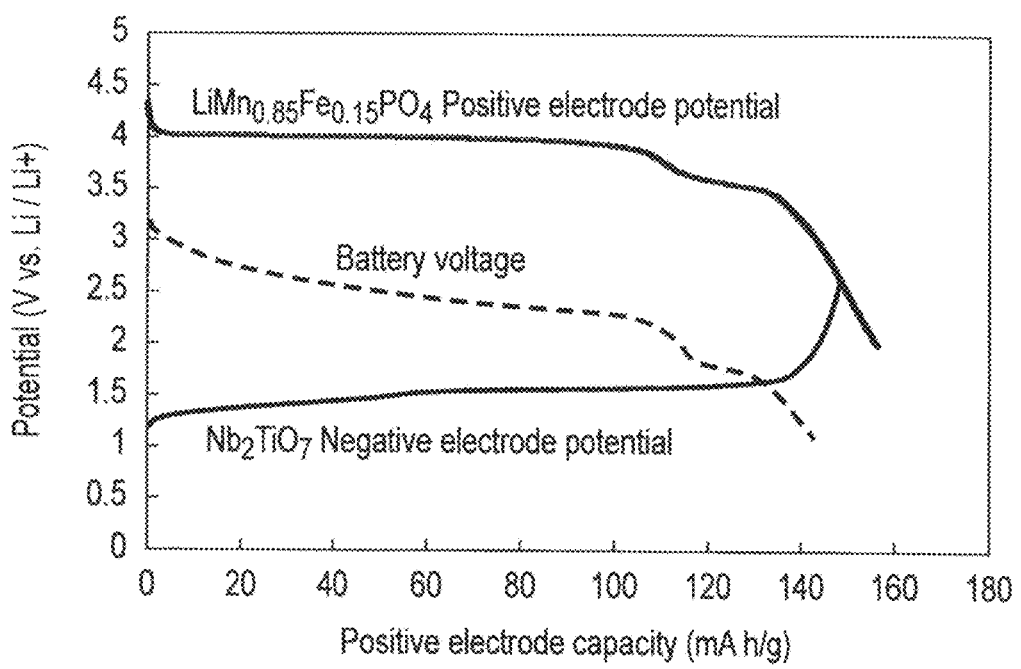
FIG. 7 is a view showing discharge curves of a positive electrode potential, a negative electrode potential, and a battery voltage as for another example of the nonaqueous electrolyte battery of the embodiment.

The negative electrode active material preferably contains at least one kind selected from the group consisting of lithium titanate having a spinel structure, titanium dioxide having a monoclinic system structure (bronze structure), and a niobium titanium oxide ($Li_xNb_aTiO_7$ ($0\leq x$, $1\leq a\leq 4$)). Accordingly, the cycle life performance of the nonaqueous electrolyte battery can be significantly improved. It is more preferable to use titanium dioxide having a monoclinic system structure (bronze structure) or a niobium titanium oxide ($Li_xNb_aTiO_7$ ($0\leq x$, $1\leq a\leq 4$)). In a nonaqueous electrolyte battery comprising a negative electrode including such an active material and a positive electrode including the positive electrode active material of the first embodiment, the voltage is dropped with a proper gradient at the final discharge stage, and the depth of discharge (DOD) can be monitored with high accuracy. Thus, the over-discharge can be prevented. For example, FIG. 6 shows discharge curves of the positive electrode potential, negative electrode potential, and battery voltage in the case where the positive electrode active material particles having an average composition of $LiMn_{0.85}Fe_{0.15}PO_4$ and $TiO_2$ (B) are used. FIG. 7 shows discharge curves of the positive electrode potential, negative electrode potential, and battery voltage in the case where the positive electrode active material particles having an average composition of $LiMn_{0.85}Fe_{0.15}PO_4$ and $Nb_2TiO_7$ are used. In FIGS. 6 and 7, the potential of the positive electrode or the negative electrode is represented by (V vs. $Li/Li^+$), and a unit of a battery voltage is represented by V. As shown in FIGS. 6 and 7, it is found that when $TiO_2$ (B) or $Nb_2TiO_7$ is used for the negative electrode active material, the battery voltage at the final stage of discharge is dropped according to decrease of the capacity, and the discharge termination can be detected with high accuracy by measuring changes in battery voltage.

The average particle size of the primary particles of the negative electrode active material is preferably set to a range of 0.001 µm or more to 1 µm or less. Even if the particle form is either granular or fibrous, an excellent performance is obtained. In the case of the fibrous particles, the fiber diameter is preferably 0.1 µm or less.

Preferably, the average particle size of the negative electrode active material is 1 µm or less, and the specific surface area measured by the BET adsorption method based on N2 adsorption is from 3 to 200 $m^2/g$. Thus, it is possible to increase the affinity of the negative electrode with the nonaqueous electrolyte.

The specific surface area of the negative electrode material layer (except the collector) measured by the BET adsorption method can be set to a range of 3 $m^2/g$ or more to 50 $m^2/g$ or less. More preferably, the range of the specific surface area is from 5 $m^2/g$ or more to 50 $m^2/g$ or less.

The porosity of the negative electrode (except for the collector) is preferably set to a range of 20 to 50%. Thus, a negative electrode having an excellent affinity with the nonaqueous electrolyte and a high-density can be obtained. More preferably, the range of the porosity is from 25 to 40%.

The negative electrode current collector is preferably aluminum foil or aluminum alloy foil.

The thickness of the aluminum foil or aluminum alloy foil is preferably 20 µm or less, more preferably 15 µm or less. The purity of the aluminum foil is preferably 99.99% by mass or more. Preferable examples of the aluminium alloy include alloys containing elements, such as magnesium, zinc, or silicon. On the other hand, the content of transition metals such as iron, copper, nickel, or chromium is set to preferably 100 mass ppm or less.

As the conductive agent, for example, one of acetylene black, carbon black, coke, carbon fiber, graphite, metal compound powder, metal powder or a mixture thereof can be used. More preferable examples thereof include coke having an average particle size of 10 µm or less (heat treatment temperature: 800° C. to 2000° C.), graphite, acetylene black, and metal powders such as TiO, TiC, TiN, Al, Ni, Cu, or Fe.

Examples of the binder include polytetrafluoroethylene (PTFE), polyvinylidene fluoride (PVdF), fluorine rubber, acrylic rubber, styrene butadiene rubber, and a core shell binder.

As for the compounding ratio of the negative electrode active material, the conductive agent, and the binder, it is preferable that the content of the negative electrode active material is from 80 to 95% by mass, the content of the conductive agent is from 1 to 18% by mass, and the content of the binder is from 2 to 7% by mass.

The negative electrode is produced, for example, by suspending the negative electrode active material, conductive agent, and binder in an appropriate solvent, applying the slurry to the current collector, drying it, and heat-pressing it.

(3) Nonaqueous Electrolyte

The nonaqueous electrolyte contains a liquid nonaqueous electrolyte prepared by dissolving an electrolyte in an organic solvent, a gel nonaqueous electrolyte obtained by compounding an organic solvent and a polymer material or a solid nonaqueous electrolyte obtained by compounding a lithium salt electrolyte and a polymer material. Further, a room temperature molten salt (ionic liquid) containing lithium ions may be used as the nonaqueous electrolyte. Examples of the polymer material can include polyvinylidene fluoride (PVdF), polyacrylonitrile (PAN), and polyethylene oxide (PEO).

The nonaqueous electrolyte is preferably in the form of a liquid, a gel or a solid containing lithium ions. The liquid nonaqueous electrolyte is preferably an organic electrolytic solution having a freezing point of −20° C. or less and a boiling point of 100° C. or more or a room temperature molten salt (ionic liquid).

The liquid nonaqueous electrolyte is prepared by dissolving an electrolyte in an organic solvent at a concentration of 0.5 to 2.5 mol/L.

Examples of the electrolyte include $LiBF_4$, $LiPF_6$, $LiAsF_6$, $LiClO_4$, $LiCF_3SO_3$, $LiN(CF_3SO_2)_2$, $LiN(C_2F_6SO_2)_2$, $Li(CF_3SO_2)_3C$, and $LiB[(OCO)_2]_2$. One or two or more kinds of electrolyte can be used. It is preferable to contain at least one of $LiPF_6$ and $LiBF_4$. Thus, the chemical stability of the organic solvent can be improved and the film resistance on the negative electrode can be reduced, resulting in an improvement in low temperature performance and cycle life performance.

Examples of the organic solvent include cyclic carbonates such as propylene carbonate (PC) and ethylene carbonate (EC); linear carbonates such as diethyl carbonate (DEC) and dimethyl carbonate (DMC), and methylethyl carbonate (MEC); linear ethers such as dimethoxyethane (DME) and diethoxy ethane (DEE); cyclic ethers such as tetrahydrofuran (THF) and dioxolane (DOX); γ-butyrolactone (GBL), acetonitrile (AN), and sulfolane (SL). These organic solvents can be used alone or in the form of a mixture of two or more kinds thereof. When one or more kinds selected from the group consisting of propylene carbonate (PC), ethylene carbonate (EC), and γ-butyrolactone (GBL) are included, the boiling point of the nonaqueous electrolyte becomes 200° C. or more and the thermal stability becomes higher. Thus, this is preferred. When one or more kinds selected from the group consisting of γ-butyrolactone (GBL), diethoxy ethane (DEE), and diethyl carbonate (DEC) are included, a lithium salt having a high concentration can be used. Thus, the output performance at low temperatures can be increased. It is preferable that 1.5 to 2.5 mol/L of the lithium salt is dissolved in an organic solvent. Accordingly, high output can be attained even at low temperatures.

The room temperature molten salt means a salt in which at least a part of the salt exhibits a liquid form at a room temperature. The room temperature means a temperature range in which the power source is assumed to be normally operated. As for the temperature range in which the power source is assumed to be normally operated, the upper limit is about 120° C., in some cases about 60° C. The lower limit is about −40° C., in some cases about −20° C. Especially, a range of −20° C. or more to 60° C. or less is suitable. The room temperature molten salt (ionic liquid) preferably consists of a lithium ion, an organic cation, and an organic anion. It is preferable that the room temperature molten salt remains in a liquid form even at room temperature or less.

Examples of the organic cation include an alkyl imidazolium ion having a skeleton shown in Formula (1) below and a quaternary ammonium ion.

[Chemical formula 1]

Formula (1)

Preferable examples of the alkylimidazolium ion include dialkylimidazolium ion, trialkylimidazolium ion, and tetraalkylimidazolium ion. As the dialkylimidazolium, 1-methyl-3-ethylimidazolium ion (MEI$^+$) is preferred. As the trialkylimidazolium ion, 1,2-diethyl-3-propylimidazolium ion (DMPI$^+$) is preferred. As the tetraalkylimidazolium ion, 1,2-diethyl-3,4(5)-dimethylimidazolium ion is preferred.

Preferable examples of the quaternary ammonium ion include tetraalkylammonium ion and cyclic ammonium ion. Preferable examples of the tetraalkylammonium ion include dimethylethyl methoxyethylammonium ion, dimethylethylmethoxymethylammonium ion, dimethylethylethoxyethylammonium ion, and trimethylpropylammonium ion.

The melting point can be adjusted to 100° C. or less, more preferably 20° C. by using the alkylimidazolium ion or the quaternary ammonium ion (particularly, tetraalkylammonium ion). Furthermore, the reactivity with the negative electrode can be made low.

The concentration of the lithium ion is preferably 20 mol % or less. It is more preferably from 1 to 10 mol %. If it is set within this range, a liquid room temperature molten salt is easily formed even at a low temperature of 20° C. or less. Further, the viscosity can be made low and the ionic conductivity can be made high even at a room temperature or less.

The anion preferably is one or more anions selected from $BF_4^-$, $PF_6^-$, $AsF_6^-$, $ClO_4^-$, $CF_3SO_3^-$, $CF_3COO^-$, $CH_3COO^-$, $CO_3^{2-}$, $(FSO_2)_2N^-$, $N(CF_3SO_2)_2^-$, $N(C_2F_5SO_2)_2^-$; $(CF_3SO_2)_3C^-$. The anions are coexistent so that a room temperature molten salt having a melting point of 20° C. or less can be easily formed. More preferable examples of the anion include $BF_4^-$, $(FSO_2)2N^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. These anions allow a room temperature molten salt at 0° C. or less to be more easily formed.

(4) Separator

A separator can be arranged between the positive electrode and the negative electrode. As the separator, for example, a synthetic resin non-woven fabric, a cellulose non-woven fabric, and a polyolefin-based porous film (e.g., a polyethylene porous film and a polypropylene porous film) can be used. As the separator, the polyolefin-based porous film or the cellulose non-woven fabric is preferred.

The porosity of the separator is preferably 50% or more.

Preferably, the thickness of the separator is from 10 to 100 μm and the density is from 0.2 to 0.9 g/cm$^3$. When these items are in the above ranges, the balance between mechanical strength and a reduction in battery resistance can be kept and therefore, a battery which has high output and is reduced in the development of internal short circuits can be provided. Further, the heat-shrinkage in the high temperature environments is reduced and an excellent high-temperature-storage performance can be attained. The thickness of the separator is more preferably from 20 to 100 μm.

A separator of cellulose fiber preferably has a porosity of 60% or more. Examples thereof include non-woven fabrics having a fiber diameter of 10 μm or less, films, and papers. Particularly, the cellulose fiber separator has a porosity of 60% or more, and thus the impregnation properties of the electrolyte are excellent. A high output performance from low to high temperatures can be attained. It is more preferably from 62 to 80%. The cellulose fiber separator having a porosity of 60% or more does not react with the negative electrode during long-term charge storage, float charge or over-charge. The internal short circuits caused by deposition of lithium metal or lithium dendrites can be prevented. Further, when the fiber diameter is set to 10 μm or less, the affinity with the nonaqueous electrolyte is improved. Thus, the battery resistance can be reduced. More preferably, the fiber diameter is 3 μm or less.

(5) Outer Case

As the case housing the positive electrode, the negative electrode, and the nonaqueous electrolyte, a metal case or a case of formed of a laminate film can be used.

As the metal case, a square-type or cylindrical-type metal can formed of aluminium, an aluminium alloy, iron or stainless steel can be used. The thickness of the case is set to preferably 0.5 mm or less, more preferably 0.3 mm or less.

Examples of the laminate film include a multilayer film obtained by covering an aluminum foil with a resin film. Polymers such as polypropylene (PP), polyethylene (PE), nylon, and polyethylene terephthalate (PET) can be used for the resin. The thickness of the laminate film is preferably set to 0.2 mm or less. The purity of the aluminum foil is preferably 99.5% by mass or more.

The metal can consisting of an aluminium alloy is preferably formed of an alloy having an aluminum purity of 99.8% by mass or less which contains elements such as manganese, magnesium, zinc, or silicon. The thickness of the can be reduced by increasing the strength of the metal can consisting of an aluminium alloy. As a result, a thin, light-weight, and high power battery having an excellent heat releasing property can be attained.

Figure 2:
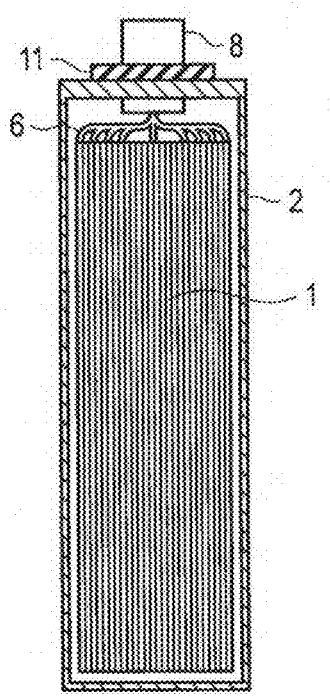
FIG. 2 is a side view of the battery of FIG. 1.

A rectangular secondary battery of the embodiment is shown in FIG. 1 and FIG. 2. As shown in FIG. 1, an electrode group 1 is housed in a rectangular cylindrical metal case 2. The electrode group 1 has a structure in which a positive electrode 3, a negative electrode 4 and a separator 5 placed between them are spirally wound so that the resulting product has a flat shape. Nonaqueous electrolyte (not shown in FIG.) is held in the electrode group 1. As shown in FIG. 2, multiple portions of the edges of the positive electrodes 3, which are located at the edge face of the electrode group 1, are each electrically connected to belt-like positive electrode leads 6. Also, multiple portions of the edges of the negative electrode 4, which are located at this edge face, are each electrically connected to belt-like negative electrode leads 7. The multiple positive electrode leads 6 are bundled together in a group, which is electrically connected to a positive electrode conductive tab 8. A positive electrode terminal is formed of the positive electrode leads 6 and the positive electrode conductive tab 8. The negative electrode leads 7 are bundled together in a group, which is electrically connected to a negative electrode conductive tab 9. A negative electrode terminal is formed of the negative electrode leads 7 and the negative electrode conductive tab 9. A metal sealing plate 10 is fixed to an opening of the metal case 2 by welding or the like. The positive electrode conductive tab 8 and the negative electrode conductive tab 9 are each pulled outside through holes, which are provided in the sealing plate 10. An inner circumferential surface of each hole in the sealing plate 10 is covered with an insulating member 11, in order to avoid short-circuit caused by contact with the positive electrode conductive tab 8 or the negative electrode conductive tab 9.

The kind of the battery is not limited to the rectangular battery, and various kinds of batteries including cylindrical batteries, slim-type batteries, coin-shaped batteries, and the like can be made. In addition, the shape of the electrode group is not limited to the flat shape, and may be formed into a cylindrical shape, laminated shape, or the like.

According to the nonaqueous electrolyte battery of the second embodiment, it is possible to realize a nonaqueous electrolyte battery excellent in cycle life, float charge resistance, and discharge rate performance, because a positive electrode containing the positive electrode active material of the first embodiment is included.

Third Embodiment

A battery pack according to the third embodiment includes one or more nonaqueous electrolyte batteries according to the second embodiment. The battery pack may comprise a battery module consisting of a plurality of batteries. The batteries may be connected in series or parallel. Particularly, they are connected in series. Preferably, the number of series-connected batteries is a multiple (n) of 6 (n represents an integer of 1 or more). A positive electrode containing the positive electrode active material according to the first embodiment, and a negative electrode containing at least one of lithium titanium oxide having a spinel structure, a niobium titanium oxide, and $TiO_2$ (B) are used so that an intermediate voltage of the battery can be adjusted to 2 V. In this case, when the number of series-connected batteries is a multiple (n) of 6 (n represents an integer of 1 or more), the voltage becomes 12 V in the case where the number of series is 6. Excellent compatibility with a lead storage battery pack is realized. Further, in a battery produced by using the positive electrode and the negative electrode, it is possible to allow a voltage curve to have a proper slope. Thus, the capacity, SOC, SOD, and DOD can be easily detected by only monitoring the voltage, similarly to the lead storage battery. As a result, in a battery pack in which the number of series-connected batteries is a multiple (n) of 6, the influence due to variations among batteries is reduced. Thus, it can be controlled by only monitoring the voltage.

Figure 3:
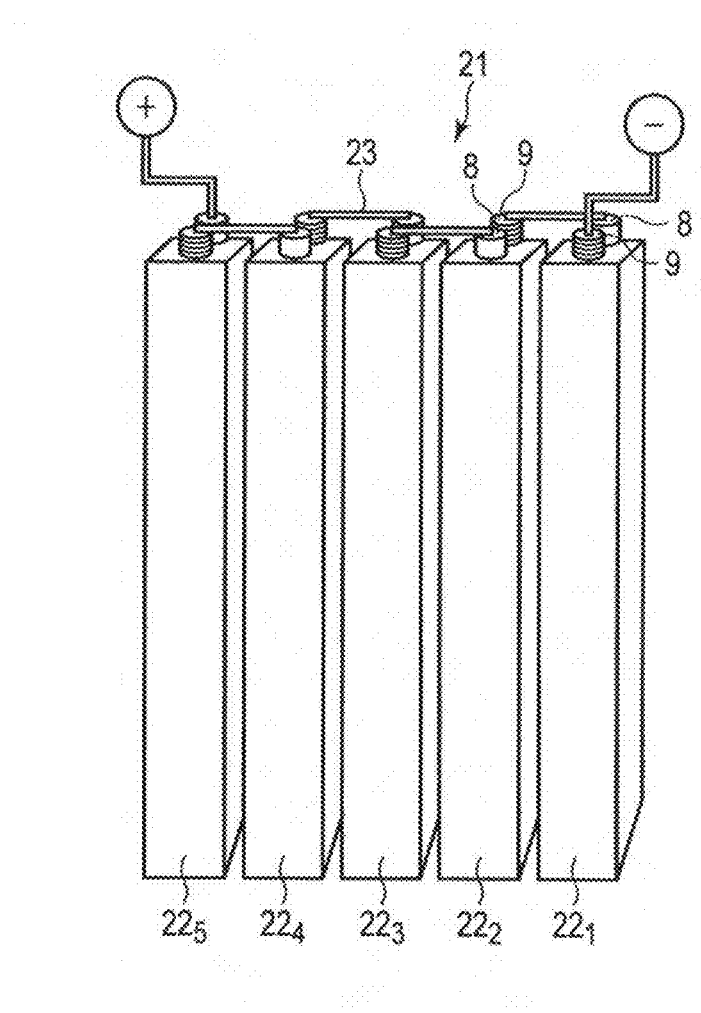
FIG. 3 is a perspective view showing an example of a battery module used for a battery pack of an embodiment.

One embodiment of a battery module used in the battery pack is shown in FIG. 3. A battery module 21 shown in FIG. 3 has multiple rectangular secondary batteries $22_1$ to $22_5$ of the second embodiment. A positive electrode conductive tab 8 of the secondary battery $22_1$ is electrically connected to a negative electrode conductive tab 9 of the secondary battery $22_2$, which is located next to the battery $22_1$, through a lead 23. Further, a positive electrode conductive tab 8 of this secondary battery $22_2$ is electrically connected to a negative electrode conductive tab 9 of the secondary battery $22_3$, which is located next to the battery $22_2$, through the lead 23. The secondary batteries $22_1$ to $22_5$ are connected in series in this way.

As a casing in which the battery module is housed, a metal can formed of an aluminum alloy, iron or stainless steel, and a plastic case may be used. The case has desirably a plate thickness of 0.5 mm or more.

The embodiments of the battery pack may be arbitrarily changed depending on the use. The battery pack is preferably used for packs which have the excellent cycle performance at a large current. Specifically, it is preferably used for a power source for digital cameras, and for car use, such as hybrid electric vehicles with two to four wheels, electric vehicles with two to four wheels, and assist bicycles. It is preferably used for car use.

According to the third embodiment, it is possible to realize a battery pack excellent in cycle life, float charge resistance, and discharge rate performance because the nonaqueous electrolyte battery according to the second embodiment is included.

EXAMPLES

Examples of the present invention will be hereinafter described in detail with reference to the drawings. However, the present invention is not limited thereto.

Example 1

The positive electrode active material was synthesized by the following method. As a first step, hydrothermal synthesis was performed at 200° C. using a solution containing 2.7 mol/L of manganese sulfate ($MnSO_4 \cdot 5H_2O$), 0.3 mol/L of iron sulfate ($FeSO_4 \cdot 7H_2O$), 4.5 mol/L of lithium sulfate ($Li_2SO_4$), 3.0 mol/L of ammonium hydrogen phosphate to prepare a precursor. Subsequently, the precursor was pulverized with a ball mill, and subjected to heat treatment in an argon atmosphere at 700° C. to prepare $LiMn_{0.9}Fe_{0.1}PO_4$ particles having a composition wherein x is 0.1.

Figure 4:
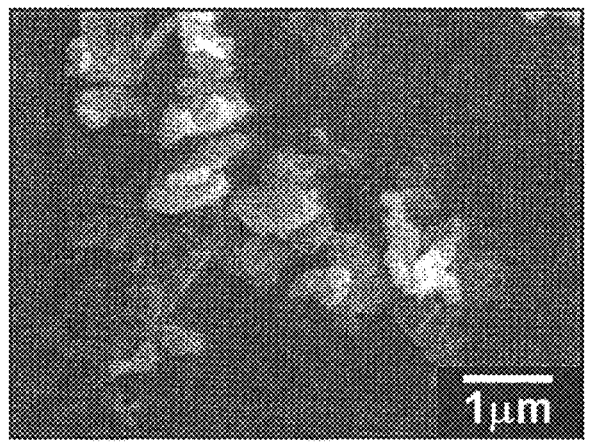
FIG. 4 is a view showing a scanning electron microscope photograph of primary particles of a positive electrode active material of Example 1.
Figure 5:
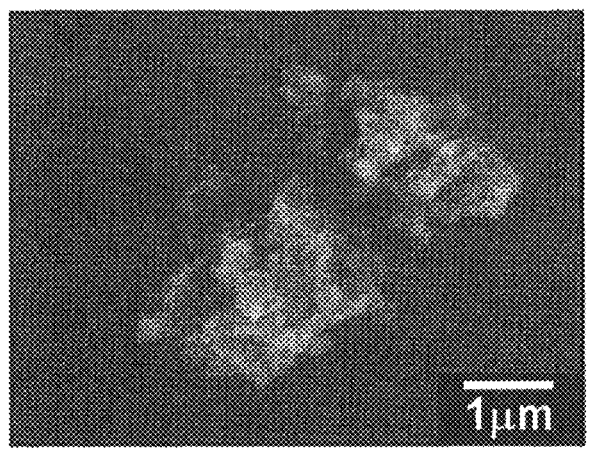
FIG. 5 is a view showing a scanning electron microscope photograph of secondary particles of a positive electrode active material of Example 1.

Then, 0.009 mol/L of carboxymethylcellulose (CMC) as a carbon source was added to a solution containing 2.55 mol/L of manganese sulfate ($MnSO_4 \cdot 5H_2O$), 0.45 mol/L of iron sulfate ($FeSO_4 \cdot 7H_2O$), 4.5 mol/L of lithium sulfate ($Li_2SO_4$), and 3.0 mol/L of ammonium hydrogen phosphate. The obtained solution was mixed with $LiMn_{0.9}Fe_{0.1}PO_4$ particles and stirred. Thereafter, the mixture was subjected to a hydrothermal synthesis at 200° C. to prepare a precursor. The precursor was pulverized with a ball mill again, and subjected to heat treatment in an argon atmosphere at 700° C. to prepare $LiMn_{0.85}Fe_{0.15}PO_4$ particles having a composition wherein x is 0.15. The obtained particles contained secondary particles. FIG. 4 shows a scanning electron microscope photograph (SEM photograph) of primary particles, and FIG. 5 shows a scanning electron microscope photograph (SEM photograph) of secondary particles. The average diameter of the primary particles was 0.5 μm. In the positive electrode active material particles, the composition of the surface was $LiMn_{0.65}Fe_{0.35}PO_4$, and the composition of the central portion was $LiMn_{0.9}Fe_{0.1}PO_4$. Therefore, Formula (1) was satisfied. A part of the surfaces of the positive electrode active material particles was covered with a carbonaceous material having an interplanar spacing $d_{002}$ of 0.36 nm derived from (002) reflection according to the powder X-ray diffraction.

By weight, 5% of graphite powder as a conductive agent based on the total amount of the positive electrode and 5% by weight of PVdF as a binder based on the total amount of the positive electrode were added to the positive electrode active material particles. The mixture was dispersed into an n-methylpyrrolidone (NMP) solvent to prepare a slurry. Thereafter, the obtained slurry was applied to a 15-μm-thick aluminum alloy foil (purity: 99% by mass), which was then treated through drying and pressing processes to produce a positive electrode in which the thickness of the positive electrode material layer on one surface was 43 μm and the electrode density was 2.2 g/cm$^3$. The specific surface area of the positive electrode material layer was 5 m$^2$/g.

$TiO_2$ (B) particles containing primary particles having an average particle size of 0.1 μm, secondary particles having an average particle size of 5 μm, and a BET specific surface area of 10 m$^2$/g, graphite powder having an average particle size of 6 μm as a conductive agent, and PVdF as a binder were mixed at a weight ratio of 95:3:2. The mixture was dispersed into an n-methylpyrrolidone (NMP) solvent, which was stirred at a rotating speed of 1000 rpm for 2 hours using a ball mill to prepare a slurry. The obtained slurry was applied to a 15-μm-thick aluminum alloy foil (purity: 99.3% by mass), which was then treated through drying and heat-pressing processes to produce a negative electrode in which the thickness of the negative electrode material layer on one surface was 59 μm and the electrode density was 2.2 g/cm$^3$. The porosity of the negative electrode except the collector was 35%. The BET specific surface area of the negative electrode material layer (surface area per 1 g of the negative electrode material layer) was 5 m$^2$/g.

The measurement method of the negative electrode active material particles will be shown below. In the particle measurement of the negative electrode active material, a laser diffraction particle size analyzer (SOLD-300, Shimadzu Corporation) was used. First, about 0.1 g of a sample, a surfactant, and 1 to 2 mL of distilled water were added to a beaker and sufficiently stirred. The mixture was placed to an agitation bath and the luminous intensity distribution was measured at intervals of 2 seconds 64 times. The particle size was measured by a method of analyzing particle size distribution data.

The BET specific surface area, based on $N_2$ adsorption, of the negative electrode active material and the negative electrode material layer was measured under the following conditions.

One g of the negative electrode active material powder or two negative electrodes cut into a size of 2×2 cm$^2$ were used as samples. The BET specific surface area measurement device (manufactured by Yuasa Ionics Co., Ltd.) was used. As the adsorption gas, nitrogen gas was used.

The porosity of the negative electrode was calculated by comparing the volume of the negative electrode material layer with the volume of the negative electrode material layer in the case of a porosity of 0% and determining an increase in the negative electrode material layer in the case of a porosity of 0% as a pore volume. The volume of the negative electrode material layer is a total of the volumes of both sides of the negative electrode material layer in the case where the negative electrode material layer is formed on both sides of the collector.

On the other hand, a separator of regenerated cellulose fiber obtained from a pulp as a raw material (having a thickness of 30 μm, a porosity of 65%, and an average fiber diameter of 1 μm) was contacted with the positive electrode so as to cover it. The negative electrode was laminated thereon. A ratio (Sp/Sn) of an area (Sp) of the positive electrode material layer and an area (Sn) of the negative electrode material layer was set to 0.98. The end of the negative electrode material layer was allowed to project from the end of the positive electrode material layer. The positive electrode, the negative electrode, and the separator were spirally wound to produce an electrode group. Further, an electrode width (Lp) of the positive electrode material layer was 50 mm, an electrode width (Ln) of the negative electrode material layer was 51 mm, and a ratio of Lp/Ln was 0.98.

The electrode group was pressed to be molded into a flat shape. The electrode group was housed in a case of a thin metal can formed of a 0.25 mm-thick aluminium alloy (Al purity: 99% by mass).

On the other hand, 1 mol/L of lithium hexafluorophosphate ($LiPF_6$) as lithium salt was dissolved in a mixed solvent of propylene carbonate (PC) and diethyl carbonate (DEC) (volume ratio of 1:1) as an organic solvent to prepare a liquid nonaqueous electrolyte (nonaqueous electrolyte). The nonaqueous electrolyte was injected into the electrode group to produce a square-type nonaqueous electrolyte secondary battery having the structure shown FIG. 1, a thickness of 14 mm, a width of 63 mm, and a height of 96 mm. The average discharge voltage during discharge was 2.45 V.

Examples 2 to 10

The blending amount of iron sulfate ($FeSO_4.7H_2O$) was adjusted to synthesize positive electrode active material particles in which the average composition, the ratio α of Fe of the surface layer, and the ratio β of Fe of the central portion were values shown in Table 1 below. In Example 10, 0.15 mol/L of magnesium sulfate ($MgSO_4$) as an Mg source was added to a solution. Nonaqueous electrolyte secondary batteries were produced in the same manner as described in Example 1 except that the synthesized positive electrode active materials and the negative electrode active materials shown in Table 1 below were used. In Example 8, a negative electrode active material prepared by mixing $TiO_2$ (B) with $Li_{4/3+x}Ti_{5/3}O_4$ at a mass ratio of 1:1 was used. The average discharge voltages during discharge are also shown in Table 1.

Examples 11 to 14

The blending amount of iron sulfate ($FeSO_4.7H_2O$) was adjusted to synthesize positive electrode active material particles in which the average composition, the ratio α of Fe of the surface layer, and the ratio β of Fe of the central portion were values shown in Table 1 below. In Examples 11 to 14, 0.15 mol/L of a sulfate of a metal of Ni, Co, Sn or Nb (as a source of Ni, Co, Sn or Nb) was added to a solution. Nonaqueous electrolyte secondary batteries were produced in the same manner as described in Example 1 except that the synthesized positive electrode active materials and the negative electrode active materials shown in Table 1 below were used. Further, the average discharge voltages during discharge are also shown in Table 1.

Comparative Example 1

The positive electrode active material was synthesized by the following method. As a first step, hydrothermal synthesis was performed at 200° C. using a solution containing 0.45 mol/L of manganese sulfate ($MnSO_4.5H_2O$), 2.55 mol/L of iron sulfate ($FeSO_4.7H_2O$), 4.5 mol/L of lithium sulfate ($Li_2SO_4$), 3.0 mol/L of ammonium hydrogen phosphate to prepare a precursor. Subsequently, the precursor was pulverized with a ball mill, and subjected to heat treatment in an argon atmosphere at 700° C. to prepare LiMn$_{0.15}$Fe$_{0.85}$PO$_4$ particles having a composition wherein x is 0.85.

Then, 0.009 mol/L of carboxymethylcellulose (CMC) as a carbon source was added to a solution containing 2.85 mol/L of manganese sulfate (MnSO$_4$.5H$_2$O), 0.225 mol/L of iron sulfate (FeSO$_4$.7H$_2$O), 4.5 mol/L of lithium sulfate (Li$_2$SO$_4$), and 3.0 mol/L of ammonium hydrogen phosphate. The obtained solution was mixed with LiMn$_{0.15}$Fe$_{0.85}$PO$_4$ particles and stirred. Thereafter, the mixture was subjected to a hydrothermal synthesis at 200° C. to prepare a precursor. The precursor was pulverized with a ball mill again, and subjected to heat treatment in an argon atmosphere at 700° C. to prepare LiMn$_{0.2}$Fe$_{0.8}$PO$_4$ particles having a composition wherein x is 0.8. The obtained particles contained secondary particles. The average diameter of the primary particles was 0.5 μm. In the positive electrode active material particles, the composition of the surface was LiMn$_{0.95}$Fe$_{0.05}$PO$_4$, and the composition of the central portion was LiMn$_{0.15}$Fe$_{0.85}$PO$_4$. A part of the surfaces of the positive electrode active material particles was covered with a carbonaceous material having an interplanar spacing d$_{002}$ the same as that of Example 1 according to the powder X-ray diffraction.

Nonaqueous electrolyte secondary batteries were produced in the same manner as described in Example 1 except that the synthesized positive electrode active materials and the negative electrode active materials shown in Table 1 below were used. The average discharge voltages during discharge are also shown in Table 1.

Comparative Example 2

A nonaqueous electrolyte secondary battery was produced in the same manner as described in Comparative example 1 except that the positive electrode active material shown in Table 1 below was used. The average discharge voltages during discharge are also shown in Table 1.

Comparative Example 3

Carboxymethylcellulose (CMC) in a volume of 0.009 mol/L as a carbon source was added to a solution containing 1.5 mol/L of manganese sulfate (MnSO$_4$.5H$_2$O), 4.5 mol/L of iron sulfate (FeSO$_4$.7H$_2$O), 4.5 mol/L of lithium sulfate (Li$_2$SO$_4$), and 3.0 mol/L of ammonium hydrogen phosphate. After stirring, the mixture was subjected to a hydrothermal synthesis at 200° C. to prepare a precursor. The precursor was pulverized with a ball mill again, and subjected to heat treatment in an argon atmosphere at 700° C. to prepare LiMn$_{0.5}$Fe$_{0.5}$PO$_4$ particles having a composition wherein x is 0.5. The obtained particles contained secondary particles. The average diameter of the primary particles was 0.5 μm. As for the composition of the positive electrode active material particles, the composition of the surface was equal to the composition of the central portion. It was LiMn$_{0.5}$Fe$_{0.5}$PO$_4$. A part of the surfaces of the positive electrode active material particles was covered with a carbonaceous material having an interplanar spacing d$_{002}$ the same as that of Example 1 according to the powder X-ray diffraction.

Nonaqueous electrolyte secondary batteries were produced in the same manner as described in Example 1 except that the synthesized positive electrode active materials and the negative electrode active materials shown in Table 1 below were used. The average discharge voltages during discharge are also shown in Table 1.

Comparative Example 4

A nonaqueous electrolyte secondary battery was produced in the same manner as described in Comparative example 1 except that the negative electrode active material shown in Table 1 below was used. The average discharge voltages during discharge are also shown in Table 1.

Comparative Example 5

A nonaqueous electrolyte secondary battery was produced in the same manner as described in Example 1 except that the positive and negative electrode active materials shown in Table 1 below were used. The average discharge voltages during discharge are also shown in Table 1.

The battery performance as for the secondary batteries of the examples and the comparative examples was measured. The results are shown in Table 2.

In the examples and Comparative examples 1 to 3, each battery was charged up to 3.0 V (100% charge) with a constant current of 1 C at 25° C., charged at a constant voltage of 3.0 V (charge time: 3 hours), and discharged up to 1.5 V at 1 C. Then, the initial discharge capacity (Ah) at 25° C. and the discharge energy (Wh) were measured. After the same charging procedure, 5-C-high rate discharge was performed. The capacity-maintenance ratio of the obtained 5 C discharge capacity to 1 C discharge capacity was measured. Thereafter, the charge/discharge cycle was repeated. The number of times of the charge/discharge cycles reaching a capacity-maintenance ratio of 80% was determined as the cycle life. Each battery was charged up to 3.0 V with a constant current of 1 C at 45° C., and charging was continued at a constant voltage of 3.0 V (float charge) for two weeks. Thereafter, the remaining capacity was measured. The float charge was repeated, and the remaining capacity after 180 days was measured. Average discharge voltages of the secondary batteries of Examples 1 to 10 and Comparative examples 1 to 5 were shown in Table 1.

On the other hand, in Comparative examples 4 and 5, each battery was charged up to 4.2 V (100% SOC) with a constant current of 1 C at 25° C., charged at a constant voltage of 4.2 V (charge time: 3 hours), and discharged up to 3.0 V at 1 C. Then, the initial discharge capacity at 25° C. and the discharge energy (Wh) were measured. After the same charging procedure, 5-C-high rate discharge was performed. The capacity-maintenance ratio of the obtained 5 C discharge capacity to 1 C discharge capacity was measured. Thereafter, the charge/discharge cycle was repeated. The number of times of the charge/discharge cycles reaching a capacity-maintenance ratio of 80% was determined as the cycle life. Each battery was charged up to 4.2 V with a constant current of 1 C at 45° C., and charging was continued at a constant voltage of 4.2 V (float charge) for two weeks. Thereafter, the remaining capacity was measured. The float charge was repeated, and the remaining capacity after 180 days was measured. These measurement results are shown in Table 2 below.

TABLE 1

| | Average composition of positive electrode active material | Ratio α of Fe of surface layer | Ratio β of Fe of central portion | Negative electrode active material | Average voltage (V) |
|---|---|---|---|---|---|
| Example 1 | $LiMn_{0.85}Fe_{0.15}PO_4$ | 0.35 | 0.1 | $TiO_2(B)$ | 2.45 |
| Example 2 | $LiMn_{0.9}Fe_{0.1}PO_4$ | 0.35 | 0.05 | $TiO_2(B)$ | 2.5 |
| Example 3 | $LiMn_{0.95}Fe_{0.05}PO_4$ | 0.2 | 0.01 | $TiO_2(B)$ | 2.5 |
| Example 4 | $LiMn_{0.8}Fe_{0.2}PO_4$ | 0.5 | 0.15 | $TiO_2(B)$ | 2.4 |
| Example 5 | $LiMn_{0.5}Fe_{0.5}PO_4$ | 0.75 | 0.3 | $TiO_2(B)$ | 2.0 |
| Example 6 | $LiMn_{0.95}Fe_{0.05}PO_4$ | 0.1 | 0 | $TiO_2(B)$ | 2.5 |
| Example 7 | $LiMn_{0.9}Fe_{0.1}PO_4$ | 0.35 | 0.05 | $Li_{4/3}Ti_{5/3}O_4$ | 2.5 |
| Example 8 | $LiMn_{0.9}Fe_{0.1}PO_4$ | 0.35 | 0.05 | $TiO_2(B)/Li_{4/3}Ti_{5/3}O_4(1:1)$ | 2.5 |
| Example 9 | $LiMn_{0.9}Fe_{0.1}PO_4$ | 0.35 | 0.05 | $Nb_2TiO_7$ | 2.5 |
| Example 10 | $LiMn_{0.8}Mg_{0.05}Fe_{0.15}PO_4$ | 0.35 | 0.1 | $Nb_2TiO_7$ | 2.5 |
| Example 11 | $LiMn_{0.8}Ni_{0.05}Fe_{0.15}PO_4$ | 0.35 | 0.1 | $Nb_2TiO_7$ | 2.5 |
| Example 12 | $LiMn_{0.8}Co_{0.05}Fe_{0.15}PO_4$ | 0.35 | 0.1 | $Nb_2TiO_7$ | 2.5 |
| Example 13 | $LiMn_{0.8}Sn_{0.05}Fe_{0.15}PO_4$ | 0.35 | 0.1 | $Nb_2TiO_7$ | 2.5 |
| Example 14 | $LiMn_{0.8}Nb_{0.05}Fe_{0.15}PO_4$ | 0.35 | 0.1 | $Nb_2TiO_7$ | 2.5 |
| Comparative example 1 | $LiMn_{0.2}Fe_{0.8}PO_4$ | 0.05 | 0.85 | $Li_{4/3}Ti_{5/3}O_4$ | 1.9 |
| Comparative example 2 | $LiMnPO_4$ | 0 | 0 | $Li_{4/3}Ti_{5/3}O_4$ | 2.3 |
| Comparative example 3 | $LiMn_{0.5}Fe_{0.5}PO_4$ | 0.5 | 0.5 | $Li_{4/3}Ti_{5/3}O_4$ | 2.0 |
| Comparative example 4 | $LiMn_{0.2}Fe_{0.8}PO_4$ | 0.05 | 0.85 | Graphite | 3.3 |
| Comparative example 5 | $LiMnPO_4$ | 0 | 0 | Graphite | 3.8 |

TABLE 2

| | 25° C., discharge capacity (Ah) | Discharge test at 1 C., energy (Wh) | Cycle life test, cycle number | Float charge at 45° C., capacity-maintenance ratio (%) | Discharge test at 5 C, capacity-maintenance ratio (%) |
|---|---|---|---|---|---|
| Example 1 | 4.1 | 10 | 6000 | 95 | 90 |
| Example 2 | 4.0 | 10 | 5000 | 90 | 90 |
| Example 3 | 4.0 | 10 | 4000 | 85 | 80 |
| Example 4 | 4.0 | 9.6 | 6000 | 95 | 95 |
| Example 5 | 4.2 | 8.4 | 8000 | 97 | 95 |
| Example 6 | 4.0 | 10 | 4000 | 85 | 70 |
| Example 7 | 3.6 | 9 | 8000 | 97 | 90 |
| Example 8 | 3.8 | 9.5 | 7000 | 95 | 85 |
| Example 9 | 4.8 | 12 | 6000 | 95 | 90 |
| Example 10 | 4.6 | 11 | 7000 | 95 | 90 |
| Example 11 | 4.5 | 11 | 6500 | 95 | 90 |
| Example 12 | 4.5 | 11 | 6500 | 95 | 90 |
| Example 13 | 4.3 | 10 | 7000 | 95 | 95 |
| Example 14 | 4.4 | 10 | 7500 | 95 | 95 |
| Comparative example 1 | 2.0 | 3.8 | 1000 | 70 | 50 |
| Comparative example 2 | 1.0 | 2.5 | 300 | 50 | 30 |
| Comparative example 3 | 3.8 | 7.6 | 1000 | 70 | 50 |
| Comparative example 4 | 2.0 | 6.6 | 500 | 40 | 30 |
| Comparative example 5 | 1.0 | 3.8 | 100 | 10 | 20 |

As is clear from Tables 1 and 2, the nonaqueous electrolyte batteries of Examples 1 to 10 are excellent in discharge energy, cycle life, high rate discharge performance, and float charge resistance at 45° C. as compared with Comparative examples 1 to 5.

In Comparative example 1, the ratio α of Fe of the surface of the positive electrode active material particles was lower than the ratio β of Fe of the central portion, thus was particularly poor in discharge energy, cycle life, and high rate discharge performance. In Comparative example 3 in which the ratio α of Fe of the surface of the positive electrode active material particles was equal to the ratio β of Fe of the central portion, the cycle life and the high rate discharge performance were low. In the case where graphite is used as the negative electrode active material, there is no large difference between Comparative example 4 in which the ratio α of Fe of the surface of the positive electrode active material particles is lower than the ratio β of Fe of the central portion and Comparative example 5 in which the positive electrode active material particles not containing Fe are used. Both the cases were inferior to the examples.

According to the positive electrode active material of at least one of the embodiments and the examples, there can be provided a positive electrode active material excellent in cycle life, float charge resistance, and discharge rate performance, because the positive electrode active material particles have an olivine structure, are represented by $LiMn_{1-x-y}Fe_xM_yPO_4$, and satisfy Formula (1) (β<α).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
a positive electrode comprising a positive electrode active material;
a negative electrode; and
a nonaqueous electrolyte,
wherein the positive electrode active material comprises positive electrode active material primary particles which have an olivine structure, are represented by $LiMn_{1-x-y}Fe_xM_yPO_4$ where $0 \leq x \leq 0.5$, $0 \leq y \leq 0.2$ where M is at least one element selected from the group consisting of Mg, Ni, Co, Sn, and Nb, and satisfy Formula (1) below:

$$\beta < \alpha \quad (1)$$

wherein the positive electrode active material primary particles comprise a surface portion, $\alpha$ is a ratio of Fe in $LiMn_{1-\alpha-y}Fe_\alpha M_yPO_4$ which is a composition of the surface portion of the positive electrode active material primary particles, and $\beta$ is a ratio of Fe in $LiMn_{1-\beta-y}Fe_\beta M_yPO_4$ which is a composition of a central portion of the positive electrode active material primary particles,
wherein the composition of the surface portion of the positive electrode active material primary particles is a composition of a portion having a thickness of 1 to 10 nm from a surface of a cross section of the positive electrode active material primary particle, and the composition of the central portion of the positive electrode active material primary particles is a composition of a peripheral portion within a range of 1 to 10 nm from a center of gravity of the cross section of the same positive electrode active material primary particle,
wherein an average diameter of the positive electrode active material primary particles is from 0.01 to 1 μm,
and wherein the negative electrode comprises a negative electrode active material comprising at least one oxide selected from the group consisting of titanium dioxide having a monoclinic system structure and a niobium titanium oxide.

2. A battery pack comprising the nonaqueous electrolyte battery according to claim 1.

3. The nonaqueous electrolyte battery according to claim 1, wherein $0 < y \leq 0.2$.

4. The nonaqueous electrolyte battery according to claim 1, wherein the composition of the surface portion of the positive electrode active material primary particles and the composition of the central portion of the positive electrode active material primary particles contain the same elements, and both contain Fe.

5. The nonaqueous electrolyte battery according to claim 1, wherein the composition of the surface portion of the positive electrode active material primary particles and the composition of the central portion of the positive electrode active material primary particles consist of the same elements.

6. The nonaqueous electrolyte battery according to claim 1, wherein $\alpha$ is $0.1 \leq \alpha < 1$, and the positive electrode active material further comprises a carbon-containing material which coats at least a part of the surface portion of the positive electrode active material primary particles.

7. The nonaqueous electrolyte battery according to claim 6, wherein the carbon-containing material comprises a carbonaceous material having an interplanar spacing $d_{002}$ of 0.344 nm or more derived from (002) reflection according to a powder X-ray diffraction.

8. The nonaqueous electrolyte battery according to claim 1, wherein $\beta$ is $0 < \beta \leq 0.5$.

9. The nonaqueous electrolyte battery according to claim 1, wherein $\alpha$ is $0.35 \leq \alpha \leq 0.5$, $\beta$ is $0 < \beta \leq 0.3$, and the positive electrode active material further comprises a carbon-containing material which coats at least a part of the surface portion of the positive electrode active material primary particles.

10. The nonaqueous electrolyte battery according to claim 9, wherein the carbon-containing material comprises a carbonaceous material having an interplanar spacing $d_{002}$ of 0.344 nm or more derived from (002) reflection according to the powder X-ray diffraction.

11. The nonaqueous electrolyte battery according to claim 1, wherein an average diameter of the positive electrode active material primary particles is from 0.01 to 0.5 μm.

12. The nonaqueous electrolyte battery according to claim 1, wherein the negative electrode active material comprises titanium dioxide having a monoclinic system structure.

13. The nonaqueous electrolyte battery according to claim 1, wherein the negative electrode active material comprises a niobium titanium oxide.

* * * * *